March 11, 1930.  S. U. HAMAKER  1,750,266
FODDER CUTTER
Filed Aug. 17, 1925   3 Sheets-Sheet 1

Inventor
Sidney U. Hamaker
By Frease and Bond
Attorneys

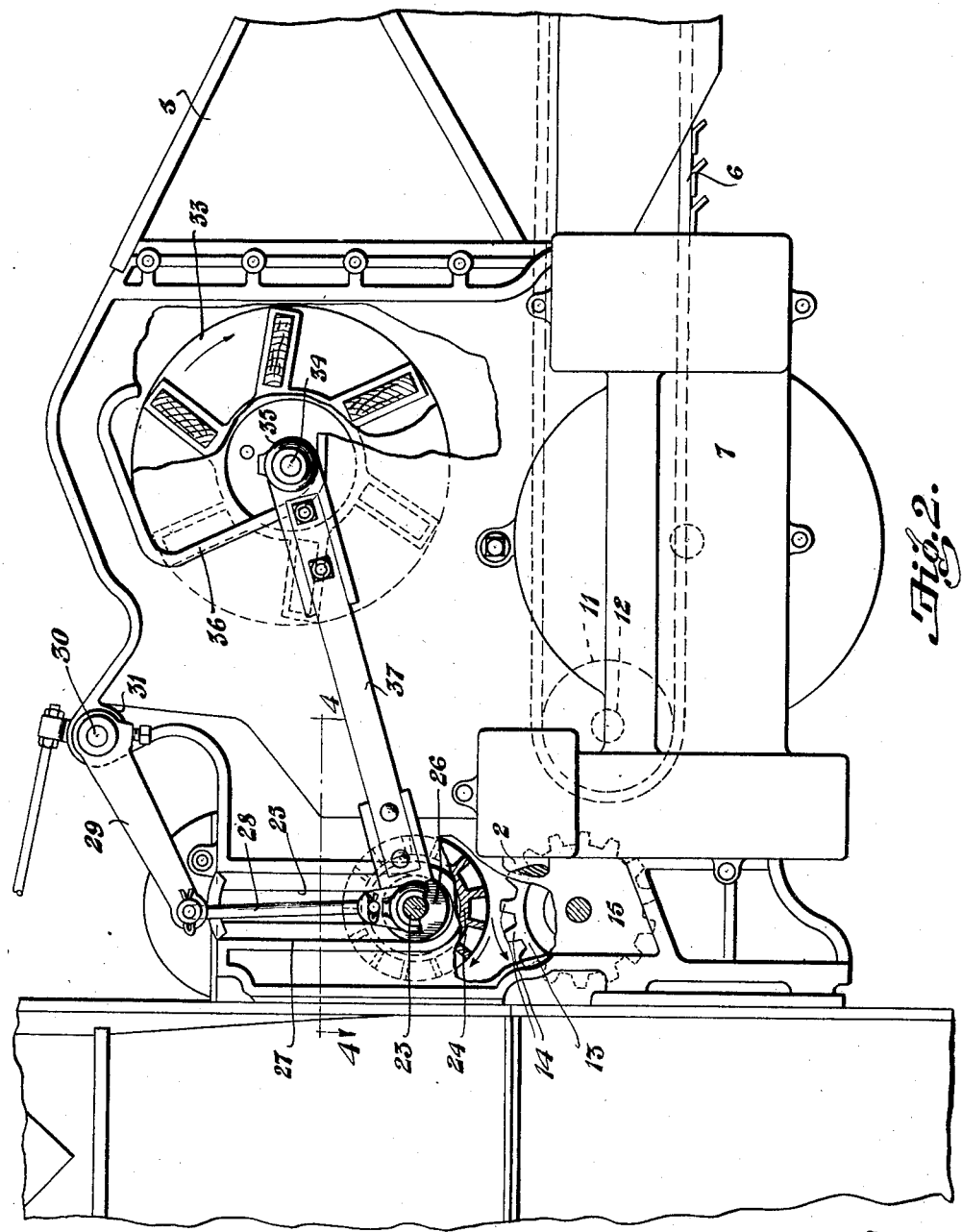

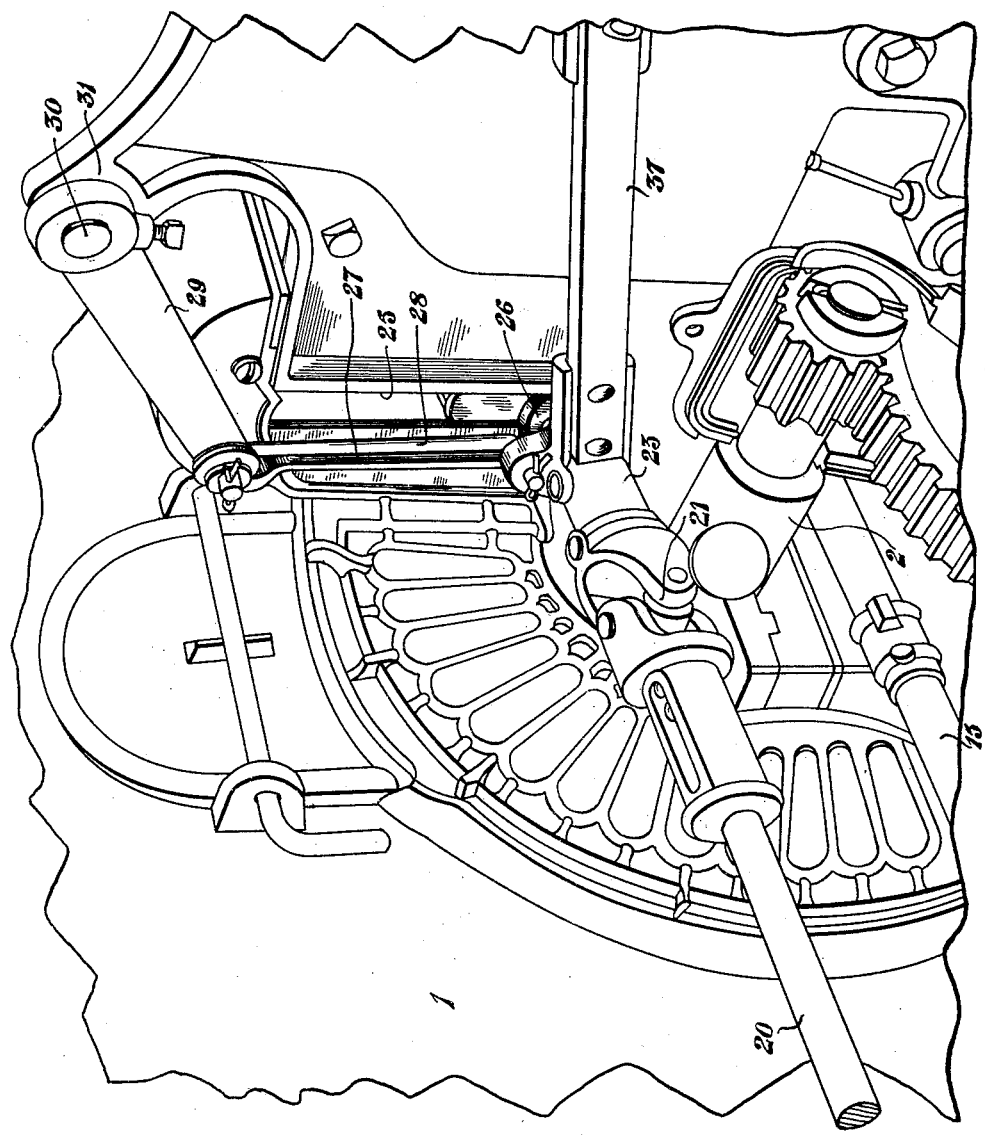

Patented Mar. 11, 1930

1,750,266

UNITED STATES PATENT OFFICE

SIDNEY U. HAMAKER, OF CANTON, OHIO, ASSIGNOR TO THE JOSEPH DICK MANUFACTURING COMPANY, OF CANTON, OHIO, A CORPORATION OF OHIO

FODDER CUTTER

Application filed August 17, 1925. Serial No. 50,804.

This invention relates to fodder cutters, and more particularly to the feed mechanism in machines for cutting corn stalks and other forage; and the object of the improvement is to provide a roller journal bearing for the upper or movable feed roll of the mechanism, whereby the roll may move laterally in its bearings, toward or from the other feed roll, to accommodate varying amounts of forage passing between the rolls.

An embodiment of the invention is illustrated in the accompanying drawings, in which—

Figure 1:
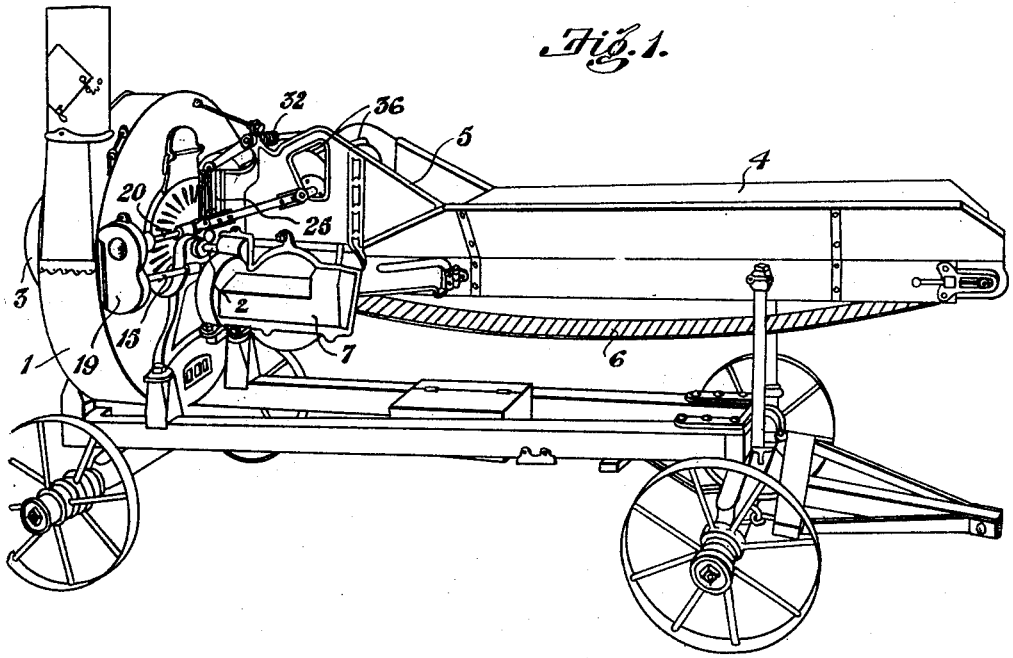
Figure 4:
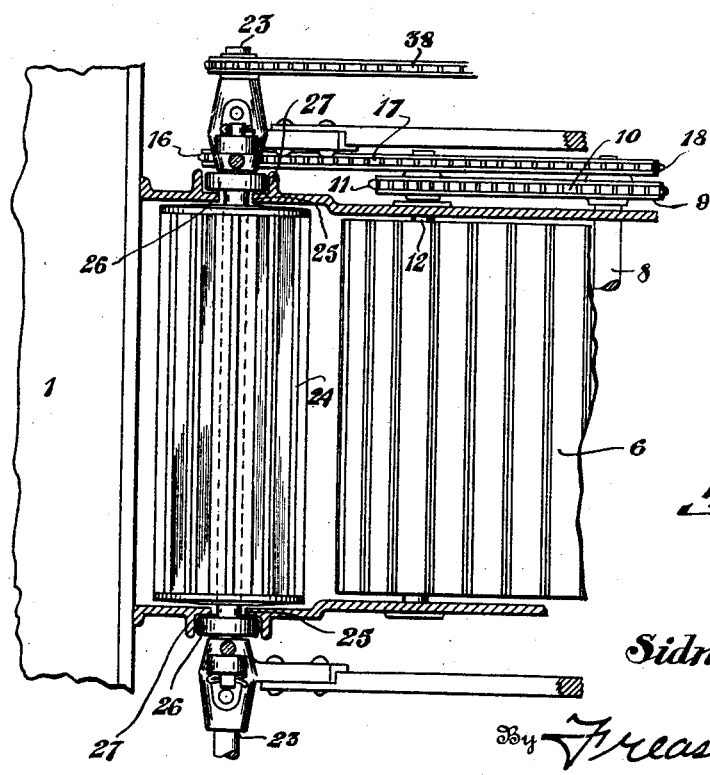

Figure 1 is a perspective view of a fodder cutter provided with the improved feed mechanism;

Fig. 2, an enlarged side elevation of the feed portion of the fodder cutter;

Fig. 3, a fragmentary perspective view of the portion of the feed mechanism including the sliding roller journal bearing for the upper feed roll; and Fig. 4, a section on the line 4—4, Fig. 2.

Similar numerals of reference indicate corresponding parts throughout the drawings.

The fodder cutter includes a case 1, having the usual cutting and blowing mechanism therein, rigidly mounted on the main shaft 2, which is axially journaled in the case and driven from any source of power through the drive pulley 3, and a feed trough 4 and feed hopper 5, having an endless conveyor belt 6 therein.

Suitable gearing within the gear housing 7 transmits power from the main shaft 2 to the feed drive shaft 8, a sprocket 9 thereon being operatively connected as by the chain 10, to the sprocket wheel 11 upon the conveyor belt drive shaft 12.

The lower feed roll 13, which may be provided with the spikes or teeth 14, is journaled in stationary bearings within the throat of the feed hopper, the shaft 15 thereof being provided with a sprocket wheel 16 to receive power as through the chain 17, from the sprocket wheel 18 upon the feed drive shaft 8.

The shaft 15 of the lower feed roll extends beyond the other side of the feed hopper, into a gear housing 19, within which is mounted suitable gearing to transmit power to the radially movable shaft 20 which is connected as by a universal joint 21 with the shaft 23 of the upper feed roll 24.

The axial shaft 23 of the upper feed roll extends through the vertical slots 25 in the sides of the feed hopper, and is provided on each end portion with a wheel 26 journaled upon the shaft and mounted in the vertical guideway 27 formed upon the adjacent sidewall of the hopper. This permits the upper feed roll to be easily moved toward or from the lower feed roll, the wheels 26 forming vertically movable wheel journal bearings for the shaft and reducing the friction, in the vertical movement of the roll, to a minimum, and preventing any binding or wedging of the journal bearings in the guideways 27.

A link 28 connects each end portion of the shaft 23 with a rocker arm 29 carried upon the rocker shaft 30 which is journaled in bearings 31 above the feed hopper, a coil spring 32 upon said shaft tending to normally urge the rocker arms 29 downward to move the upper feed roll toward the lower feed roll.

The accumulating or gathering roll indicated generally at 33, is provided with a shaft 34 carried in bearings 35, which are loosely mounted in the quadrilateral openings 36 provided in the sides of the feed hopper.

Each of the bearings 33 is connected as by a link 37 with the shaft 23 of the upper feed roll, thus permitting free movement of the accumulator roll shaft within the limits of the openings 36 and permitting free and independent movement of both the accumulator roll and upper feed roll. This accumulator roll is driven in any suitable manner as by a chain 38 operatively connected to the upper feed roll shaft 23.

In operation, the fodder to be cut is thrown into the said trough and carried forwardly into the feed hopper by the conveyor belt 6. The accumulating or gathering roll gathers the stalks into the feed hopper and co-operates with the feed rolls in passing the stalks into the cutting mechanism; and since the upper feed roll and gathering roll are each movable independently of the other, the material may be kept continuously moving through the said mechanism without choking or clogging the same.

The accumulating or gathering roll moves freely within the limits of the openings 36, while the upper feed roll can move only vertically toward or from the lower feed roll, the wheel journal bearings 26 of said upper feed roll moving vertically within the guideways 27, thus permitting free and easy movement of the upper feed roll and permitting the same to quickly adjust itself to accommodate the amount of material which is fed between the feed rolls by means of the accumulating roll and conveyor belt.

For further freeing the upward and downward movements of the upper feed roll, the wheels 26 are of less diameter than the width of the guideways 27 so that they may be normally out of contact with the sides thereof, and are never in contact with both sides at the same time; with the result that the wheels are rotatable upon contact with either one or the other side of the guideways by the pressure of the material being fed, irrespective of the rotation of the feed roll.

I claim:—

Feed mechanism for fodder cutters and the like, including a feed hopper having guideways in its side walls, a lower feed roll mounted for rotation in the hopper, an upper feed roll mounted in the hopper for moving to and from the lower feed roll and having an axial shaft extending at the ends into the guideways, and wheels journalled on the ends of the shaft and movable into rolling contact with the sides of the guideways by the pressure of the material fed between the rolls.

In testimony that I claim the above, I have hereunto subscribed my name.

SIDNEY U. HAMAKER.